United States Patent [19]

Payant

[11] 4,059,244
[45] Nov. 22, 1977

[54] TAPE CASSETTE PHRASE RETRIEVER

[76] Inventor: Noel M. Payant, 325 W. 5th St., Shakopee, Minn. 55379

[21] Appl. No.: 715,906

[22] Filed: Aug. 19, 1976

[51] Int. Cl.² .................... G03B 1/04; G11B 15/32; G11B 23/04
[52] U.S. Cl. .................................. 242/200; 360/96
[58] Field of Search .............................. 242/197–200, 242/180; 360/72–74, 93–96, 14, 132

[56] References Cited

U.S. PATENT DOCUMENTS

| 3,827,079 | 7/1974 | Bolick, Jr. ............................ 360/79 |
| 3,864,745 | 2/1975 | Platt ..................................... 360/96 |
| 3,965,483 | 6/1976 | Katoh et al. ......................... 360/72 |

Primary Examiner—Leonard D. Christian
Attorney, Agent, or Firm—Burd, Braddock & Bartz

[57] ABSTRACT

A tape cassette playback machine with a playback head utilizes a forward drive pinion, a pressure roller and capstan to drive audio tape in a cassette in forward direction past the playback head to cause the intelligence on the audio tape to be played out by the playback machine. It utilizes a reverse drive pinion to rewind the audio tape within the cassette. These drive pinions mesh with forward and reverse cassette drive sprockets, respectively, which are integral with the forward and reverse tape takeup reels within the cassette. The outer case of a cassette phrase retriever is situated over the tape cassette in the playback machine, and has a rotatably mounted reverse drive spider or pinion extending downwardly from it into driving relationship with respect to the cassette reverse drive sprocket. Manually operable mechanism is provided in the retriever for selectively driving the reverse drive spider in rewind direction through any one of several preselected angular distances thus to cause the tape within the cassette to back up past the playback head in the playback machine for any one of a plurality of preselected linear distances. This manually operable mechanism is disengaged from the reverse drive spider when not in operation, thus to let the spider turn freely with the cassette reverse drive sprocket during normal forward or rewind movement of the tape through the playback machine.

9 Claims, 9 Drawing Figures

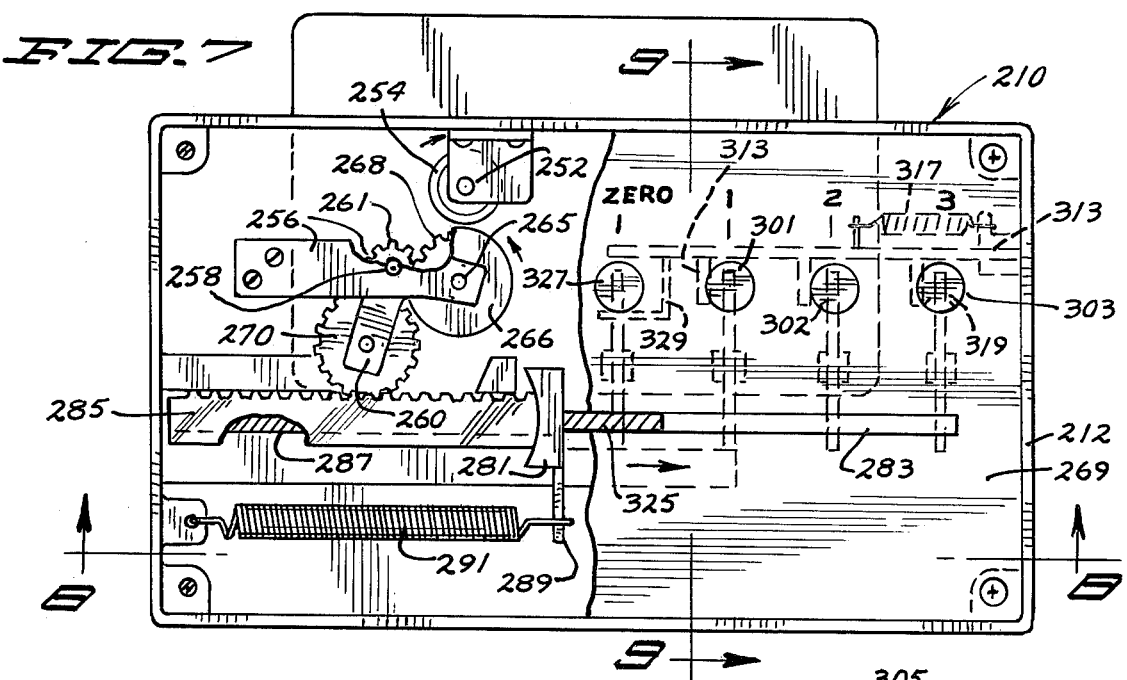
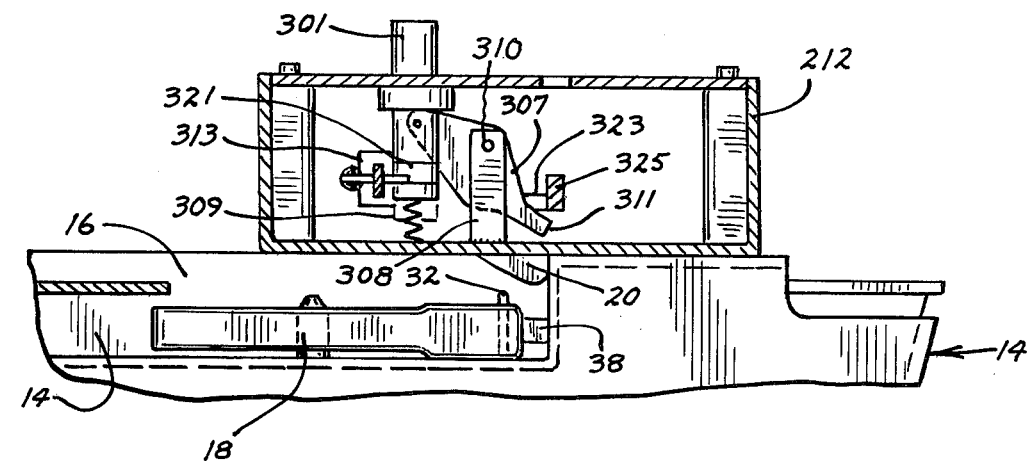

TAPE CASSETTE PHRASE RETRIEVER

BACKGROUND OF THE INVENTION

This invention has relation to a tape recorder/playback machine in which intelligence is recorded and played back on an audio tape permanently mounted on two takeup reels within a cassette which in turn is mounted in the recorder/playback machine. The invention has relation primarily to the playback phase of operation; and provides a mechanism whereby the tape in the tape recorder can be repeatedly backed up for any one of a number of preselected distances. This allows the user to stop the machine in a usual or preferred manner each time he has played back the section which he wants to repeat, to rewind a portion of the tape of just the right length back past the playback head, and then to start the playback machine in any usual or preferred manner; thus to playback the intelligence over again. The method will be repeated as many times as desired. This invention finds use where the inflections of a language or the subtleties of a musical composition are being studied and learned by the user of the invention, for example.

Tape recorder/playback machines are each provided with a cassette well to receive a generally rectangular cassette having reel mounted audio tape therein. The tape in the cassette passes along a portion of the outside of one of the longer longitudinal edges of the cassette; and means is provided in the playback machine to extend into the cassette on both sides of the tape to drive the tape in forward direction at a constant speed for the purpose of recording and/or playback of intelligence on the magnetic tape. A suitable recording head and a suitable playback head are situated in each recorder/playback machine in position to come in operational contact with the magnetic tape, for example, as it moves through the machine in forward direction. The tape in the cassette is mounted on forward and reverse tape takeup reels, and each of those reels is provided with a drive sprocket at the center thereof. There is an opening in the case of the cassette to allow forward and reverse drive pinions of the recorder/playback machine to extend into the cassette to be in operational driving relationship with respect to the forward and reverse drive sprockets of the tape reels.

Suitable mechanisms and controls including appropriately labeled manually operable control bars can be provided in the recorder/playback machine to drive the tape in forward direction to play back the intelligence recorded on the magnetic tape (PLAY); to drive the tape in forward direction to record intelligence on the tape (RECORD-PLAY); to drive the tape in forward direction at relatively high speed (FAST FORWARD); to drive the tape backward at high speed (REWIND); to stop the progres of the tape through the cassette and the machine (STOP); and to eject the cassette from the machine (EJECT).

Before the present invention when it became desirable to repeat a phrase or other small portion of the intelligence on the tape in the playback phase of operation it was necessary for the operator to stop the machine (press (STOP); to rewind the machine in the fast rewind phase (push REWIND); and, almost immediately, to interrupt the fast rewind phase (push STOP). The intelligence would then be repeated by starting up the machine (push PLAY).

In practice, this procedure is entirely unsatisfactory, as it is impossible to consistently rewind the tape, by this method, to any particular predetermined point; and so the phrase which it is desired to repeat either is often not entirely repeated, or is more often repeated only after the intelligence on the tape preceding it is also repeated. Since the same amount of rewind cannot be obtained consistently; the user's mind is necessarily on the mechanics of trying to back up the machine the right amount rather than being on the phrase which is supposed to be repeated over and over to him.

A preliminary search was completed in the public search facilities of the United States Patent and Trademark Office in the pertinent subclassifications related to magnetic tape transport and drives in Class 242, Winding and Reeling; and nothing which shows a precision means of backing up an exact length of tape in a cassette in a playback machine has been located.

The patents cited in this search were:

U.S. Pat. No. 3,865,331 to Clever, granted Feb. 11, 1975;

U.S. Pat. No. 3,857,532 to Bastiaans, granted Dec. 31, 1974;

U.S. Pat. No. 3,791,609 to Roma, granted Feb. 12, 1974;

U.S. Pat. No. 3,869,099 to Inaga, granted FEb. 4, 1975; and

U.S. Pat. No. 3,875,590 to Mandish, granted Apr. 1, 1975.

BRIEF SUMMARY OF THE INVENTION

To provide a reliable means of consistently accurately backing up audio tape in a cassette in a playback machine, while not interfering with the normal forward and rewind operation of the machine, the present invention was developed.

As an attachment to an existing playback machine with an audio tape cassette installed therein, a cassette phrase retriever of the present invention includes an outer case, positioning fingers or lugs to hold the case in fixed relationship with respect to the cassette and the playback machine, and a spider or pinion with downwardly extending legs rotatably mounted with respect to the phrase retriever case and in position to be in driving relationship with respect to a reverse drive sprocket of a reverse tape takeup reel in the cassette.

Within the retriever case, a spider drive wheel is mounted to rotate with the spider so that both are normally free to rotate with respect to the case.

A friction drive wheel is rotatably mounted on a pivot arm on an axis parallel to the axis of and in operational alignment with the spider drive wheel. The pivot arm is pivotally mounted in the retriever case on an axis parallel to and spaced from the axis of the friction drive wheel, and bias means are provided to normally tend to maintain the friction drive wheel in spaced relationship with respect to the spider drive wheel.

A plurality of manually operable finger pieces are mounted with respect to the cassette phrase retriever case, and means are provided to permit a different amount of angular movement by the friction drive wheel pursuant to the change of position of each finger piece with respect to the case.

Positive drive means, gearing in the form of the invention as shown herein, is provided for rotating the friction drive wheel in a first direction in an amount commensurate with the amount of movement or positioning of each of the finger pieces. Means is also provided for moving the friction drive wheel into operational driving relationship with respect to the spider drive wheel at the begining of friction drive wheel rotation in said first direction, to the end that rotation of the friction drive wheel in said first direction will cause said spider drive wheel to be rotated in direction to cause said spider to rotate said reverse drive sprocket to move the tape in the cassette back past the playback head in the playback machine.

While this invention has been described in terms of audio tape, it is applicable to any machine where intelligence is carried by a continuous strip which can be moved backward past a playback head by rotation of a reverse takeup reel over which the strip is wound. For example, a paper tape for operating a typewriter and on which an address is to be retrieved many times to produce return address envelopes; a video tape playout machine; or movie projector.

IN THE DRAWINGS

FIG. 7 is a top plan view of a cassette phrase retriever of a second form of the invention with parts in section and parts broken away and showing its relationship to a tape cassette of a playback machine;

FIG. 8 is a vertical sectional view taken on the line 8—8 in FIG. 7; and

FIG. 9 is a vertical sectional view taken on the line 9—9 in FIG. 7.

DESCRIPTION OF PREFERRED EMBODIMENTS

First Form of the Invention

Figure 1:
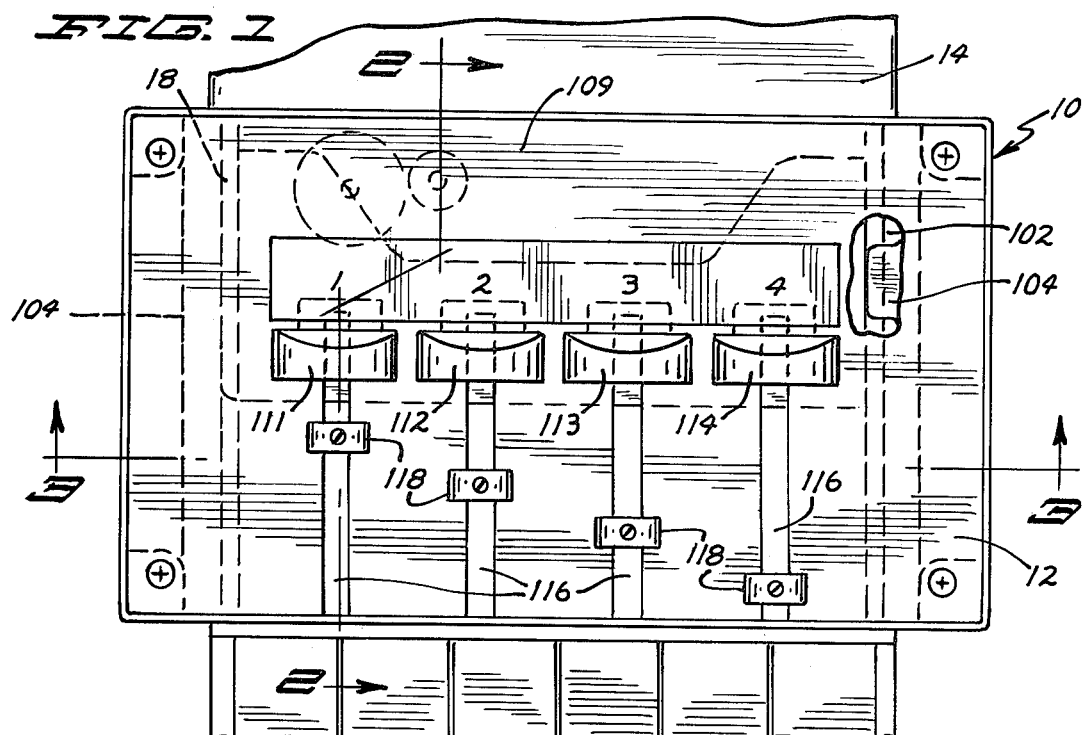
FIG. 1 is a top plan view of a cassette phrase retriever made according to a first form of the invention shown in operative relation to a playback machine and to a tape cassette in that machine.
Figure 2:
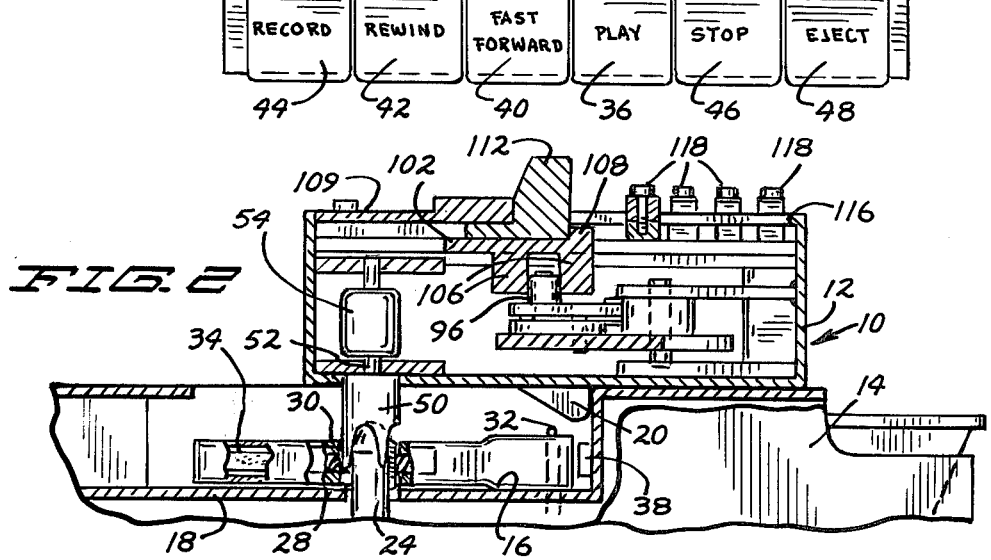
FIG. 2 is a vertical sectional view taken on the line 2—2 in FIG. 1.
Figure 3:
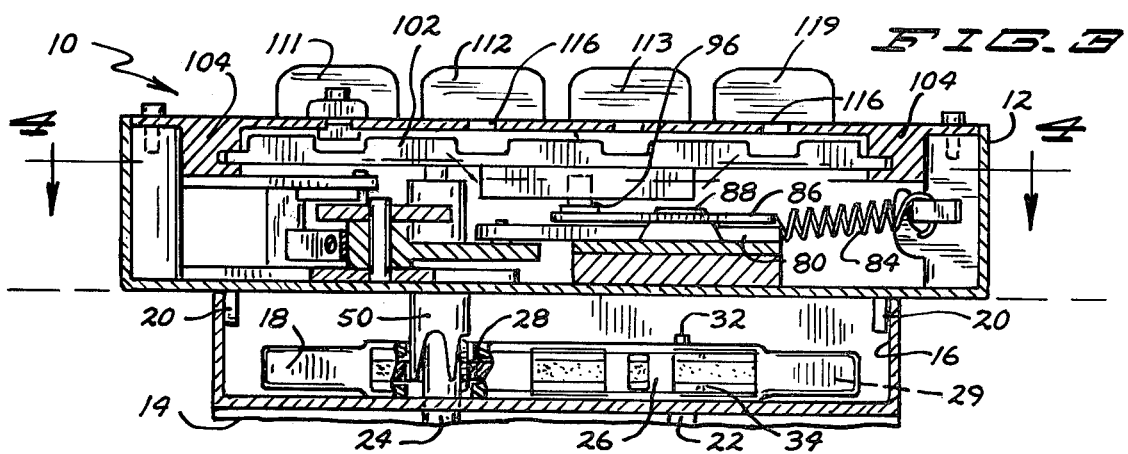
FIG. 3 is a vertical sectional view taken on the line 3—3 in FIG. 1.

As seen in FIGS. 1-6, a cassette retriever 10 made according to the first form of the invention includes an outer case 12 which is positioned above a recorder/playback machine 14 having a cassette well 16 in which an audio tape cassette 18 is situated. Lugs 20, extending downwardly from the phrase retriever 10, properly position the retriever with respect to the playback machine 14 by bearing on the appropriate surfaces of the cassette well 16. The playback machine 14 includes a forward drive pinion 22 and a reverse drive pinion 24 which extend upwardly into the cassette well 16 to be in meshing, driving relationship to a forward reel drive sprocket 26 and a reverse reel drive sprocket 28 of the tape cassette 18, respectively. As best seen in FIG. 2, in connection with reverse drive pinion 24, the reel drive sprockets 26 and 28 form an integral part of a forward tape takeup reel 29 and a reverse takeup reel 30, both of which are rotatably mounted within the cassette 18. An audio tape 34 is wound on these reels. The details of construction of the playback machine 14, the cassette 18, the tape 34, and the operative interrelationships between them are well known and form no part of the present invention in and of themselves.

It is sufficient for purposes of this specification to understand that a capstan 32, extending upwardly from below the cassette well 16 of the playback machine 14, extends through a provided opening (not shown) in the cassette to cooperate with a pressure roller (not shown) of the playback machine 14 to drive the tape 34 in forward direction off of the reverse takeup reel 30 in the "PLAY" operating phase with a control bar 36 depressed. During this same phase of operation, the forward tape takeup reel is being rotated to take up slack as the capstan drives the tape past a playback head 38.

A "FAST FORWARD" control bar 40 is provided on the playback machine 14, and when it is depressed, the tape 34 is pulled rapidly from the reverse takeup reel 30 onto the forward takeup reel 29 due to the rapid rotation of the forward drive pinion 22 of the playback machine 14 acting on the forward reel drive sprocket 26 of the cassette 18.

A "REWIND" control bar 42 is provided on the playback machine 14, and when this bar is depressed, rapid rotation of the reverse drive pinion 24 of the playback machine acting through reverse reel drive sprocket 28 causes the reverse takeup reel 30 to rapidly back tape 34 off of the forward takeup reel 29.

A "RECORD" control bar 44 on the recorder/playback machine 14 can be depressed simultaneously with "PLAY" control bar 36, and when this happens, a microphone (not shown) associated with the recorder/playback machine is activated and will permit intelligence to be recorded on the audio tape 34 through the presence of a record head (not shown) in contact with that tape.

All of the operations explained above are terminated by depressing a "STOP" control bar 46 on the machine 14; and an "EJECT" control bar 48 on the machine is operable to eject cassette 18 from the machine 14 when the cassette phrase retriever is not in operative position on the machine.

Referring to the elements of the invention and their relationship to the foregoing conventional structure of the recorder/playback machine and audio tape cassette, a cassette phrase retriever reverse driving spider or pinion 50 is rotatably mounted as at 52 in the case 12 of the cassette phrase retriever 10; and when the phrase retriever is operably associated with the playback machine 14 and cassette 18, this spider 50 is in meshing and driving relationship with respect to reverse reel drive sprocket 28 of the cassette 18. See FIGS. 2 and 3. Inside of the case 12, a spider drive wheel 54 is mounted on a common shaft with the spider 50 to rotate with it.

Figure 6:
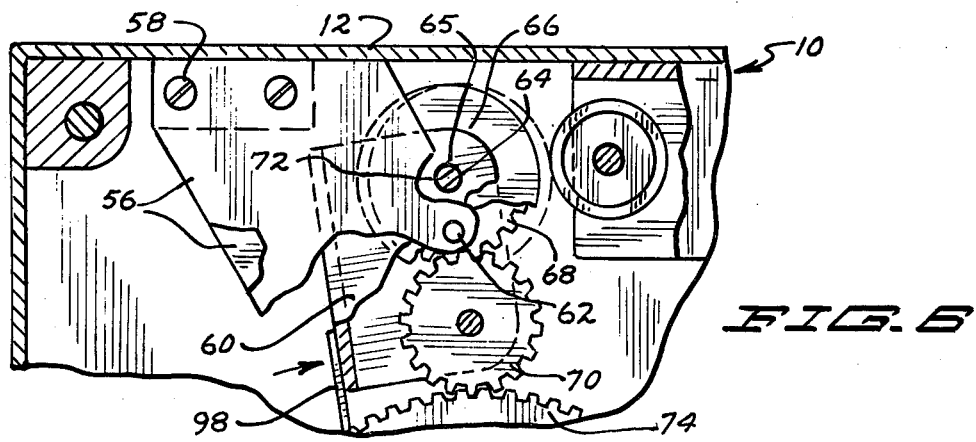
FIG. 6 is an enlarged fragmentary view of the upper lefthand corner of the cassette phrase retriever as seen in FIG. 4.

A pair of parallel spaced apart end plates 56,56 are fixedly mounted to the case 12 of the retriever 10 as at 58, and pivotally support a shaft support wobble bracket 60 as at 62. As best seen in FIG. 6, wobble bracket 60 is U-shape in cross section.

Rotatably supported as at 64 in wobble bracket 60 on a shaft 65 is a friction drive wheel 66. Concentrically mounted on the same shaft 65 is a friction drive wheel gear 68 which is in meshing relationship to an intermediate drive gear 70 which is, in turn, mounted on a shaft 71 in wobble bracket 60 as at 72.

A curved primary drive gear rack or segment 74 is pivotally mounted on a shaft 75 with respect to the case 12 as at 76 on primary drive gear segment support plates 78,78. Gear segment 74 is situated in meshing relationship with respect to intermediate drive gear 70.

Figure 4:
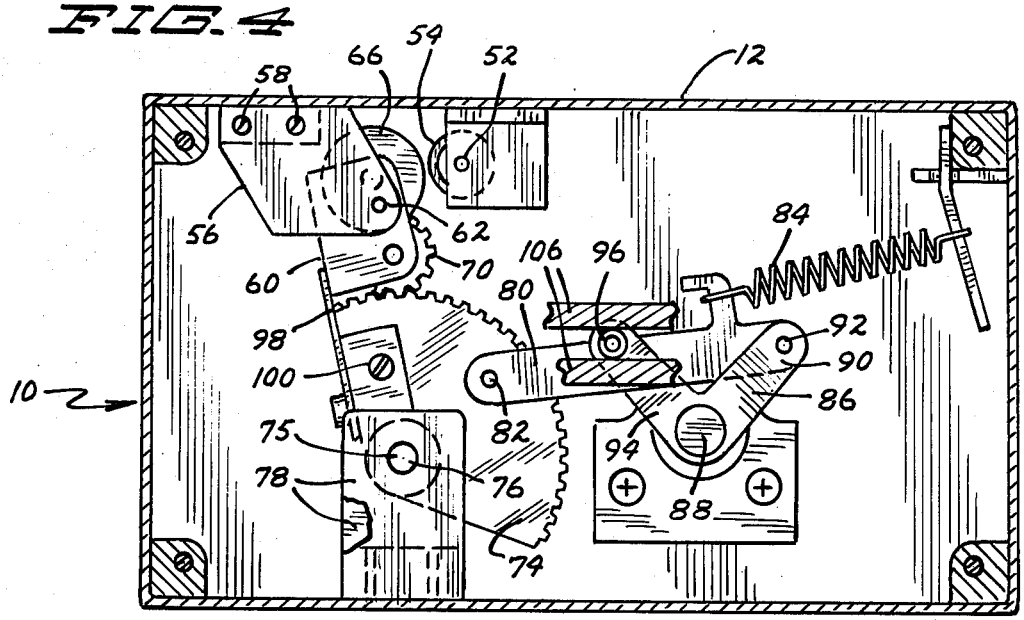
FIG. 4 is a horizontal sectional view taken on the line 4—4 in FIG. 3.
Figure 5:
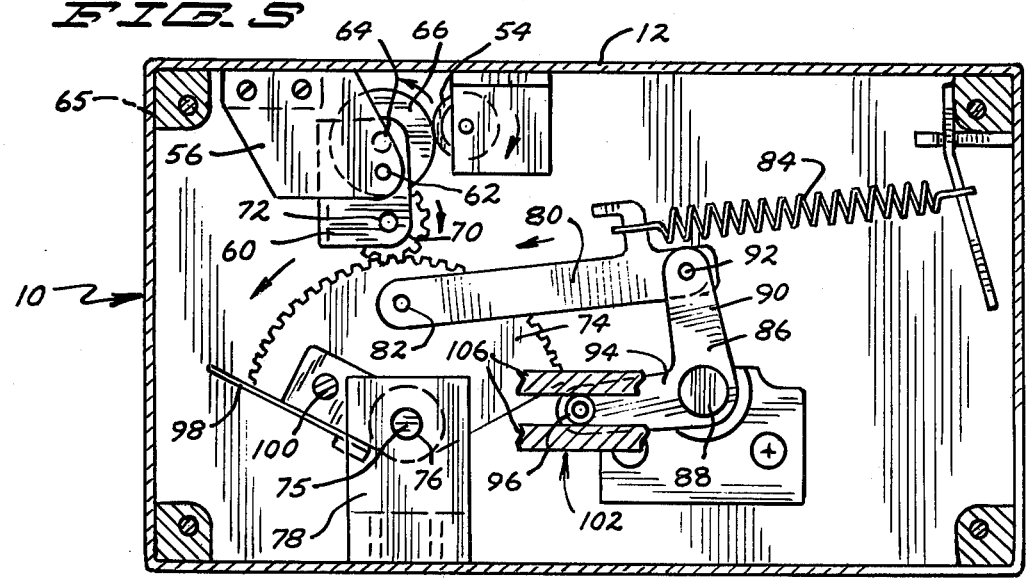
FIG. 5 is also a horizontal sectional view taken on the line 4—4 in FIG. 3, but with parts shown in the different positions from FIG. 4.

A gear segment drive link 80 is pivotally mounted to gear segment 74 as at 82, and is constantly biased to tend to move and hold the gear segment 74 in its farthermost clockwise position as seen in FIG. 4 through the instrumentality of a tension spring 84 which is fixed with respect to the case 12 on one end thereof and is fastened to the drive link 80 at the other end.

A gear segment drive link crank arm 86 is pivotally mounted with respect to the case 12 as at 88. It has a first arm 90 pivotally mounted with respect to an outer end of the gear segment drive link 80 as at 92, and has a second arm 94 which is provided with a low friction outwardly extending slide finger 96 extending perpendicularly away from the outer end of second arm 94.

A radially extending limit plate 98 is integrally fastened to a left outer end portion of primary drive gear segment 74 as at 100, as seen in FIG. 4, to be in position to impinge on a lower portion of the shaft support wobble bracket 60 to limit the clockwise movement of the rack or segment 74 and simultaneously to cause the wobble bracket 60 to move the friction drive wheel 66 into clearing relationship with respect to the spider drive wheel 54.

A slide plate 102 is mounted for vertical movement with respect to the case 12 in grooved slide blocks 104,104 which are integral with the case 12. The slide plate 102 includes two horizontal, parallel, spaced apart slider bars 106,106 together lying in encompassing contacting relationship with respect to an outer end portion of the slide finger 96 in such manner that downward movement of the slide plate 102 and the slider bars 106,106 (see FIGS. 4 and 5) will cause the slide finger 96 to rotate the gear segment drive link crank arm 86 in counterclockwise direction, moving gear segment drive link 80 to the left as seen in FIG. 4 against the action of tension spring 84. This causes the primary drive gear rack or segment 74 to rotate in counterclockwise direction, driving intermediate gear 70 to the left to cause wobble plate 60 to move friction drive wheel 66 into contacting operational relationship with respect to spider drive wheel 54 as intermediate gear 70 causes friction drive wheel gear 68 to rotate the friction drive wheel 66, causing spider drive wheel 54 to rotate spider 50 to cause reverse reel drive sprocket 28 to wind tape 34 onto reverse tape takeup reel 30, pulling tape 34 backwards past the playback head 38 in so doing.

The slide plate 102 is provided with a finger piece receiving ledge 108 extending integrally outwardly from the slide plate in the direction opposite of the slider bars 106,106. A plurality of finger pieces (four as shown) are designated 111, 112, 113 and 14; and each is mounted for slidable vertical movement with respect to the cassette phrase retriever 10 in slots 116 provided in an upper face plate 109 of the outer case 12 of the retriever 10. A plurality of finger piece stops 118 are each adjustably mounted in one of the slots 116 and serve to limit the downward movement of the particular finger piece 111-114 in accordance with where these finger piece stops are clamped along slots 116. As best seen in FIG. 2, these stops 118 include a screw threadably mounted in clamping plates on either side of the surface of the upper face plate 109 of the case 12.

As seen in FIG. 1, each of the finger pieces 111-114 is designated by a number 1 through 4, and each of the finger piece stops 118 is positioned to limit the downward movement of the finger piece in alignment with it to a different distance than that of any of the other stops.

The particular setting for the stops 118 will be determined in such a manner as to provide a variety of distances for the backward or retrieving movement of the tape 34 to pass through the playback head 38 when the different finger pieces are depressed.

In operation, when the user of the phrase retriever plays out his tape on the playback machine and from the cassette in the usual manner, and encounters a phrase which he wants to repeat a number of times to commit to memory, to study the enunciation, musical inflection, technique or for any other reason, he will depress the "STOP" control bar 46 just as the portion to be repeated finishes. He will then depress one of the finger pieces 111-114 depending on the length of the phrase which he wants to retrieve, and, consequently, how far back he wants to rewind the tape.

Movement of any one of the finger piece 111-114 in downward direction will cause that finger piece to impinge on the finger piece receiving ledge 108 of the slide plate 102, causing the slide plate to move in downward direction in the grooved slide blocks 104,104. Movement of the slider bars 106,106 with the slide plate 102 will move the slide finger 96 in downward direction thus to back the tape 34 past the playback head 38 in the manner described above.

The "PLAY" control bar 36 will then be depressed and the tape will move through the cassette and the intelligence on it will be imparted from the playback machine in the usual manner. When the phrase to be repeated is completely played back, the "STOP" control bar 46 will again be depressed and the phrase will again be retrieved in the manner just explained.

Should the user not get the entire phrase or should he get more than the phrase upon pushing any one particular finger piece down, next time he can push down another finger piece and keep changing finger pieces until he gets just exactly the right amount of retrieving.
Second Form of the Invention:

A second form of the invention is illustrated in FIGS. 7-9. In this form of the invention, the recorder/playback machine 14 and the cassette 18 and their components can be identical to those disclosed in connection with the first form of the invention, or can be of any other usual or preferred construction. Where identical parts are illustrated, identical numbers are used.

The cassette phrase retriever of the second form of the invention is designated 210. An outer case 212 of case 210 is identical with the outer case 12 of the cassette phrase retriever 10 of the first form of the invention except as to the upper face plate thereof. Lugs 20, which can be identical with the lugs 20 of the first form of the invention, extend outwardly from the outer case 212 in position to firmly hold that outer case in fixed relationship with respect to the playback machine 14 and the cassette 18, these lugs fitting into a cassette well 16 of the playback machine.

The cassette 18 has a tape 34 and a reverse reel drive sprocket 28; and the playback machine 14 has playback head 38 and a capstan 32 each of which can be identical with the structure bearing the same identification number as disclosed in the first form of the invention, or can be of any usual or preferred construction.

FIGS. 8 and 9 illustrate the relationship between the cassette phrase retriever 210, playback machine 14 and cassette 18, while FIG. 7 illustrates the relationship between retriever 210 and the cassette 18 only. It is to be understood that playback machine 14 will be associated with cassette 18 and with the retriever 210, but has been omitted from FIG. 7 for clarity of illustration.

As in the case of the first form of the invention, a cassette tape retriever reverse driving spider or pinion 50 extends downwardly from the bottom of the case 212 and into meshing driving relationship with respect to the reverse reel drive sprocket 28 of the cassette 18, and when spider 50 is turned in rewind direction, the reverse sprocket 28 will cause the tape 34 to be moved backward across the face of the playback head 38 in the same manner as described in connection with the first form of the invention.

The reverse driving spider 50 is rotatably mounted on a common shaft with a spider or pinion drive wheel 254, both being free to rotate with respect to the case 212 of the retriever 210 as at 252. A pair of parallel, spaced apart end plates 256,256 pivotally support a wobble bracket or plate 260 on a shaft 258. In this case the wobble plate 260 is constituted as a crank arm-like structure. Also mounted on shaft 258 in the end plates 256,256 is an idler gear 261 which is in meshing relationship to a friction drive wheel gear 268 and an intermediate drive gear 270. Intermediate drive gear 270 is rotatably mounted on one extremity of the wobble plate 260, while the friction drive wheel gear 268 is rotatably mounted on another extremity thereof on a shaft 265. Also rotatable on the shaft 265 with gear 268 is a friction drive wheel 266. This friction drive wheel 266 is in aligned operational relationship with respect to the spider drive wheel 254, but is normally urged into spaced relationship to it by a means to be explained.

A thumb bar 281 is slidably mounted in a slot 283 provided in an upper face plate 269 of the outer case 212 of the retriever 210. The thumb bar 281 is integral with a drive rack 285 which is slidable transversely of the longitudinal dimension of the cassette phrase retriever 210 on a drive rack positioning bar 287 which is integral with and extends upwardly from the bottom surface of the case 212. A spring retaining arm 289 extends integrally outwardly from the drive rack 285 and the thumb bar 281, and a tension coil spring 291 urges this retaining arm 289 and consequently the drive rack 285 and thumb bar 281 toward position to the left as seen in FIG. 7, the other end of the spring being anchored to the left wall of the case 212 as seen in that figure. The rack teeth of drive rack 285 are in meshing relationship with respect to intermediate drive gear 270. From FIG. 7, it can be seen that when thumb bar 281 is moved to the right, intermediate gear 270 will be urged to the right around the pivot shaft 258, thus to pivot the wobble plate 260 to force the friction drive wheel 266 into driving relationship with respect to the spider drive wheel 254, the gears causing the friction drive wheel to rotate the spider drive wheel and so the spider and in this manner to back tape 34 past the playback head 38 thus to retrieve a spoken phrase or some other portion of the intelligence on the tape.

A plurality of finger pieces 301,302 and 303, as shown, are designated on the upper face plate 269 of the casing 212 by the numerals 1, 2 and 3, respectively, and are for the purpose of limiting the motion of the drive rack 285 in direction to the right as seen in FIG. 7, thus to limit and to exactly meter out the amount of tape which is retrieved each time the retriever is operated.

As best seen in FIG. 9, each of the finger pieces 301 through 303 is pivotally mounted as at 305 to a preventor plate 307. These preventor plates 307 are each positioned between case ears 308,308 on pivot pins 310. A separate compression coil spring 309 urges each of the finger pieces in upward direction to normally hold an outer stop arm portion of each preventor plate 307 in position as seen at 311 in FIG. 9.

A finger piece catch link 313 is slidably mounted for limited movement with respect to the case 212 as at 315.

A finger piece catch link biasing spring 317 constantly urges the catch link 313 in direction to the right as seen in FIGS. 7 and 8. A plurality of finger piece catches 319 are integral with and extend outwardly from the catch link 303 each to normally rest against a downwardly extending portion of each finger piece.

Each of the downwardly extending portions of each of the finger pieces is provided with a ramped tooth 321, and when the finger piece is depressed, this ramped tooth will be engaged by one of the finger piece catches 319 to hold the finger piece in the downward position. This is illustrated at finger piece 302 in FIG. 8. This causes an outer stop arm portion of the preventor plate of the depressed finger piece to have position as seen at 323 in FIG. 9.

Extending integrally outwardly and to the right as seen in FIGS. 7 and 8 from the drive rack 285 and the thumb bar 281 is a rack stop bar 325 from the drive rack. Rack stop bar 325 is in position to clear each preventor plate 37 when its related finger piece 301 through 303 is in the up position, but to come into interfering relationship with respect to the outer stop arm portion of any preventor plate 307 when its related finger piece is being held by its ramped tooth 321 in the depressed condition.

Thus when the longest amount of tape is to be rewound to retrieve a long phrase, the finger piece 303 will be depressed and will automatically lock down as the ramped tooth 321 fastens beneath the finger piece catch 319. When an intermediate length phrase is to be retrieved, the finger piece 302 will be depressed, and when the shortest length phrase is to be repeated, the finger piece 301 will be depressed.

To release any one or all of the finger pieces 301–303, a release button 327 is provided in aligned relationship with respect to the finger pieces 301–303. The finger piece catch link 313 is provided with a yoke 329, and a yoke pin 331 extends across the outer ends of the yoke and through slots 333 provided through the lower portion of the release button 327. A compression coil spring 335 normally urges the release button 327 to its uppermost position.

When the release button 327 is depressed against the urging of spring 335, slot 333 moves yoke pin 331 to the left as seen in FIGS. 7 and 8, thus releasing each of the finger piece catches 319 from its ramped tooth 321 allowing all of the finger pieces 301 through 303 to move to their uppermost positions, placing all of the outer stop arm portions of each of the preventor plates 307 in clearing relationship with respect to the rack stop bar 325.

The embodiments of the invention in which an exclusive property or privilege is claimed are defined as follows:

1. A tape cassette phrase retriever for use with a tape cassette playback machine and a tape cassette in which tape cassette, tape containing intelligence is entrained on a forward tape takeup reel and a reverse tape takeup reel, the reverse tape takeup reel having sprocket means which, when rotated in a first direction, will cause the tape to be wound from the forward tape takeup reel onto the reverse tape takeup reel and in which the tape cassette playback machine has means for receiving said cassette, means for driving said tape from said reverse tape takeup reel towards forward tape takeup reel, means for playing out the intelligence on said tape as it moves from said reverse takeup reel to said forward takeup reel, and means for stopping said tape drive means when a phrase on said tape to be repeated has just been played out by said machine; said tape cassette phrase retriever including:
  A. a case having an outer face plate, and means cooperating with said cassette playback machine and cassette for fixedly positioning said case with respect to the cassette and playback machine;
  B. pinion means rotatably mounted with respect to said case and extending outwardly therefrom in position to be in operative driving relationship to said cassette reverse reel sprocket means so that rotation of said pinion means in a first direction will cause said sprocket means to rotate in said first direction to cause tape to be wound from said forward reel onto said reverse reel;
  C. manually operable means mounted with respect to said retriever case for positively rotating said retriever pinion means in said first direction; and
  D. means to limit the amount of movement of said manually operable means to the end that precisely the proper length of tape will be retrieved onto the reverse tape takeup reel to cause a phrase which is to be repeated to be played back beginning specifically with the start of such phrase.

2. The tape cassette phrase retriever of Claim 1 wherein said means to limit the amount of movement of said manually operable means includes:
  A. a plurality of finger pieces mounted in said case through the case face plate; and
  B. separate means associated with each of said finger pieces to separately limit the amount of movement of said manually operable means responsive to the positioning of its associated finger piece.

3. The tape cassette phrase retriever of claim 1 wherein said retriever pinion means includes a pinion shaft and a pinion mounted on said pinion shaft and positioned to be in operational relationship with respect to said reverse tape takeup reel sprocket means when said retriever is fixedly positioned with respect to said cassette and playback machine, said pinion being rotatably mounted with respect to said case;
  A. there being a pinion drive wheel mounted inside of said case on the same pinion shaft to rotate with the pinion;
  B. a wobble bracket pivotally mounted inside of said case;
  C. a fraction drive wheel rotatably mounted on said wobble bracket on an axis parallel to and spaced from the axis of the pivotal mounting of the wobble bracket with respect to the case; and
  D. said manually operable means for driving said retriever sprocket means including means for pivoting said wobble bracket to bring said friction drive wheel into driving relationship with repsect to said sprocket drive wheel and means to positively rotate said friction drive wheel.

4. The tape cassette phrase retriever of claim 3 wherein said means to limit the amount of movement of said manually operable means includes:
  A. a plurality of finger pieces mounted in said case through the case face plate; and
  B. separate means associated with each of the finger pieces to separately limit the amount of movement of said manually operable means responsive to the positioning of its associated finger piece.

5. The tape cassette phrase retriever of claim 3 wherein said manually operable means to drive said retriever pivot means includes:
  A. a friction drive wheel gear mounted to rotate with said friction drive wheel on said wobble bracket.
  B. an intermediate gear rotatably mounted on said wobble bracket and positively drivingly associated with said friction drive wheel gear;
  C. an elongated gear rack movably mounted with respect to said case and in intermeshing relationship with respect to said intermediate gear in position to move and rotate said intermediate gear to cause said wobble bracket to pivot with respect to said case to move said friction drive wheel into operational driving relationship with respect to said pinion drive wheel when said rack is moved in a first direction;
  D. manually operable means to move said gear rack in said first direction; and
  E. bias means normally urging said gear rack to move in an opposite second direction and normally urging said wobble bracket in direction to separate said friction drive wheel from said pinion drive wheel.

6. The tape cassette phrase retriever of claim 5 wherein said means to limit the amount of movement of said manually operable means includes:
  A. a plurality of finger pieces mounted in said case through the case face plate; and
  B. separate means associated with each of the finger pieces to separately limit the amount of movement of said manually operable means responsive to the positioning of its associated finger piece.

7. The tape cassette phrase retriever of claim 6 wherein:
  A. each of said finger pieces being slidably movable in a separate slot provided in said face plate between a first and one of a plurality of second positions;
  B. bias means urging each finger piece toward said first position;
  C. means operably connecting each of said finger pieces with said gear rack such that manual movement of said finger piece toward its second position causes said gear rack to move in its first direction; and
  D. a finger piece stop in each finger piece slot in the face plate in position to terminate movement of its associated finger piece when its second position is reached.

8. The tape cassette phrase retriever of claim 6 wherein
  A. each of said finger pieces being slidably mounted in a provided opening in said case face plate for movement between a first and a second position;
  B. bias means urging each finger piece toward said first position;
  C. a thumb bar operably associated with said gear rack and accessible through said case to move said gear rack from its second position toward its first position;
  D. means to retain each of said finger pieces in said second position when the finger piece is manually moved from its first to its second position; and
  E. each of said finger pieces when in its second position being in interfering relation to movement of said rack to terminate movement of said rack.

9. The tape cassette phrase retriever of claim 8 and means to release each of said finger pieces to move from said second to said first position.

* * * * *

UNITED STATES PATENT AND TRADEMARK OFFICE
CERTIFICATE OF CORRECTION

PATENT NO. : 4,059,244
DATED : November 22, 1977
INVENTOR(S) : Noel M. Payant

It is certified that error appears in the above-identified patent and that said Letters Patent are hereby corrected as shown below:

Column 1, line 57, "progres" should be --progress--.

Column 1, line 64, omit "(" after "press" in "(press STOP)".

Column 5, line 53, "14" should be --114--.

Column 8, line 27, "37" should be --307--.

Column 9, Claim 3C, "fraction" should be --friction--.

Column 9, Claim 3D, "repsect" should be --respect--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks